Oct. 21, 1969  H. D. ELLIS  3,473,303
EAR STRIPPING MECHANISM FOR HARVESTER FOR SWEET CORN
Filed Feb. 23, 1967
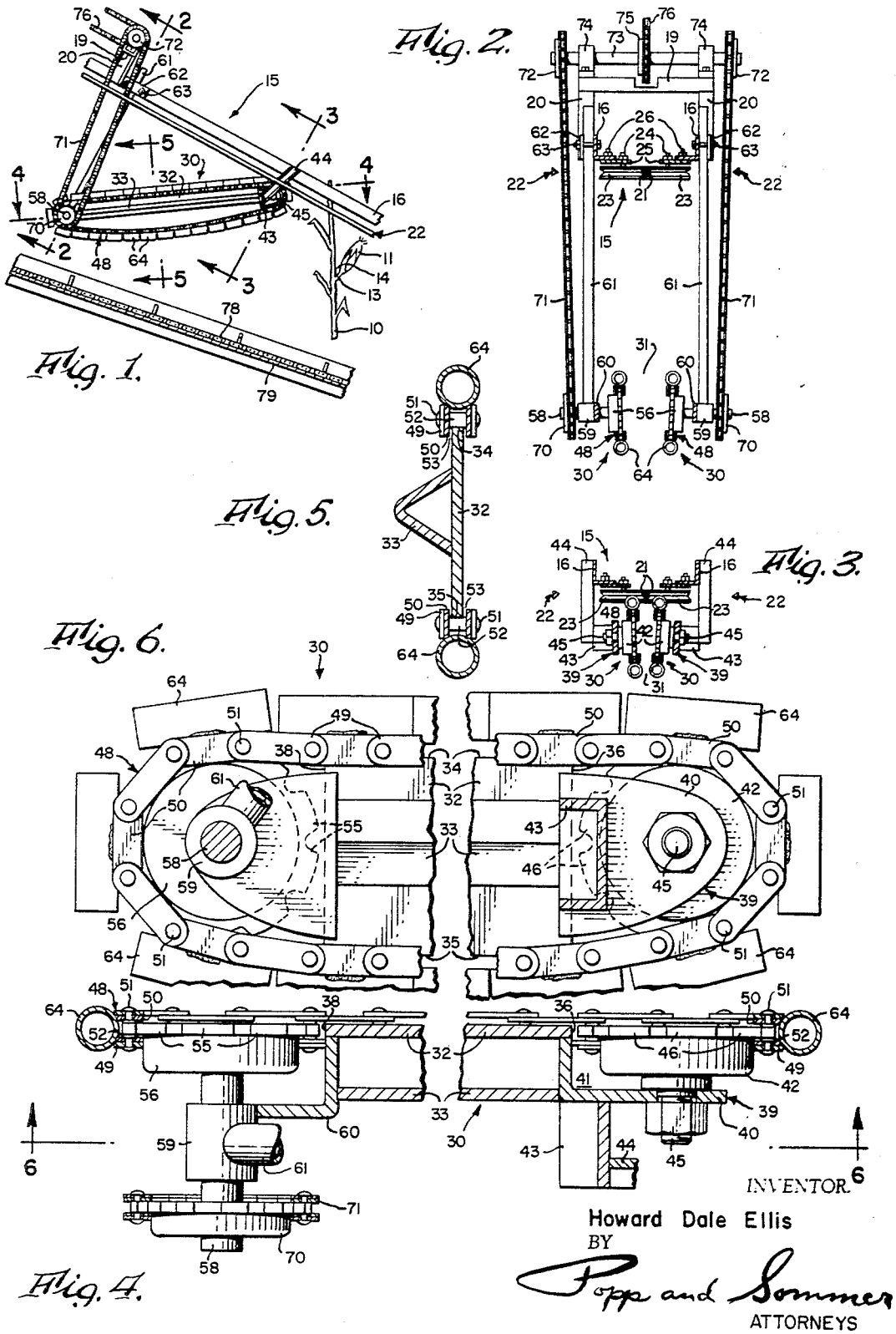
INVENTOR.
Howard Dale Ellis
BY
Popp and Sommer
ATTORNEYS though the ear is oriented, as shown in FIG. 1, so that the bar means comes into contact with the side of the ear instead of its stem. This copending application shows such bar means in the form of a pair of simple bars held in fixed relation to the harvester frame between which the stalks were propelled and it was found that some stalks were occasionally broken due to frictional engagement with these fixed bars. Such stalks broken free of their propelling means would hang up between the pair of bars and obstruct the passage of following stalks so that a mass of stalks would jam the harvester and render it inoperative until cleared. The present improvement resides in providing a moving surface on the side of the bar means so engaging the stems or ears and moving this surface along with the stalks and ears being so propelled so that the stems of the ears are engaged by a surface which is moving along therewith at substantially the same rate of speed, thereby to not only reduce the likelihood of breaking any stalk, but also to propel any broken stalk through the bar means and out of the harvester so that it would not block the passage of subsequent stalks.

United States Patent Office 3,473,303
Patented Oct. 21, 1969

3,473,303
EAR STRIPPING MECHANISM FOR HARVESTER
FOR SWEET CORN
Howard Dale Ellis, 5 SE. Dorson Way,
Delray Beach, Fla. 33444
Filed Feb. 23, 1967, Ser. No. 617,940
Int. Cl. A01d 35/14
U.S. Cl. 56—17                                    10 Claims

ABSTRACT OF THE DISCLOSURE

A harvester for sweet corn, through which severed and topped stalks bearing ears are moved upwardly and rearwardly while held in a generally upright condition, is improved by providing movable stripping bar means which move horizontally with the stalks but downwardly relative thereto to engage the stem of an ear close to its stalk and break off the ear.

---

This is an improvement on the sweet corn mobile harvester of my copending Application 566,817 filed July 21, 1966, now abandoned which moves along rows of stalks in the field cutting them off above and below their ear-bearing portions and then propels these ear-bearing stalk portions, upright, along a bar means positioned to usually pass between the stalks and their upstanding ears and engage the side of the stem of each ear close to the stalk portions, upright, along a bar means positioned to stalk to break it away from the stalk without bruising. The ears are broken off without bruising even in those minority occasions where the ear is oriented, as shown in FIG. 1, so that the bar means comes into contact with the side of the ear instead of its stem. This copending application shows such bar means in the form of a pair of simple bars held in fixed relation to the harvester frame between which the stalks were propelled and it was found that some stalks were occasionally broken due to frictional engagement with these fixed bars. Such stalks broken free of their propelling means would hang up between the pair of bars and obstruct the passage of following stalks so that a mass of stalks would jam the harvester and render it inoperative until cleared. The present improvement resides in providing a moving surface on the side of the bar means so engaging the stems or ears and moving this surface along with the stalks and ears being so propelled so that the stems of the ears are engaged by a surface which is moving along therewith at substantially the same rate of speed, thereby to not only reduce the likelihood of breaking any stalk, but also to propel any broken stalk through the bar means and out of the harvester so that it would not block the passage of subsequent stalks.

In the accompanying drawings FIG. 1 is a fragmentary side elevational view of a mobile sweet corn harvester embodying the present invention. FIGS. 2 and 3 are enlarged, fragmentary generally upright sections taken on the correspondingly numbered lines of FIG. 1. FIG. 4 is a fragmentary enlarged horizontal section taken generally on line 4—4, FIG. 1. FIG. 5 is a vertical section, on an enlarged scale, taken on line 5—5, FIG. 1. FIG. 6 is a fragmentary side elevational view taken along line 6—6, FIG. 4.

The ear stripping mechanism of the present application is an improvement of part of the type of self-propelled, mobile sweet corn harvester of my said copending application Ser. No. 566,817 which is steered along one or more rows of corn stalks in the field, cutting them off above and below their ear bearing portions 10 illustrated in the present drawing, and moving these ear bearing portions in an upstanding position past the subject ear stripping mechanism, the harvested ears falling onto a conveyor and the stripped stalks being returned to the cornfield. Sweet corn plants grow so that each ear 11 is connected to its stalk 10 by a short stem 13 which projects outwardly and in the direction of the upper part of the stalk 10 to provide an upwardly opening crotch 14 between the stem and the stalk to support each ear 11 at an acute included angle with reference to the stalk 10.

The subject ear stripping mechanism is shown as carried by a subframe 15, of which one or more can project forwardly from a self-propelled mobile main frame (not shown) which is steered so that each subframe is propelled through the cornfield in straddling relation to a row of standing corn stalks. This subframe 15 preferably can be adjusted to different elevations and carries means (not shown) for cutting off the standing corn stalks above and below the ear-bearing sections 10, such cutting off means being illustrated in detail in my said copending application.

The subframe 15 is shown as comprising a pair of laterally spaced parallel longitudinal side subframe bars 16 which are shown as being in the form of angle bars each having a bottom flange and a vertical side flange. These longitudinal side subframe bars slope downwardly and forwardly from their mounting on the self-propelled mobile main frame (shown in my copending application only) and are suitably cross connected at intervals, being shown herein as cross connected by an overhead cross channel bar 19 welded at each end to an upright channel bar or post 20, the lower end of which is welded to the vertical side flange of the companion longitudinal side subframe bar 16.

The harvester is steered so that the standing row of corn stalks pass through each subframe 15 between the longitudinal side subframe bars 16 and are picked up between the adjacent, operative stretches 21 of a pair of endless flexible V-belts 22 which pass around suitable drive and driven pulleys (not shown here) at the rear and front ends of the subframe 15 as illustrated in detail in my said copending application. These adjacent, operative stretches 21 of the V-belt 22 travel generally parallel to each other and midway between the longitudinal side subframe bars 16 from the front to the rear end of the subframe 15 and both travel at substantially the same speed as the harvester so as to be substantially stationary with reference to the ground. At their front ends these adjacent, operative contacting stretches 21 of the V-belt 22 embraces and grip between them the corn stalks standing in the field so as to support them in an upright position while being cut from the ground and topped and also while passing the ear stripping mechanism of the present application. To insure a firm grip against opposite sides of the succession of stalk portions 10 being stripped, these contacting or operative stretches 21 of the V-belts 22 are pressed together with sufficient force to firmly grasp the upright corn stalk sections or portions 10 being conveyed therebetween, this pressure being sufficient to indent the stalks. This pressure is provided by a series of peripherally V-grooved backup rolls 23 engaging the side of the operative stretch 21 of each V-belt 22 opposite its side engaging the corn stalks. Each series of these backup rolls 23 are rotatably mounted by means of pins 24 on pressure plates 25 which in turn are pivotally mounted by means of pivot pins 26 against the underside of the bottom flange of the corresponding longitudinal side subframe bar 16 in such manner that the backup rolls 23 of each pressure plate 25 apply sufficient pressure against the V-belt to grasp the corn stalk sections 10 with sufficient firmness to resist the cutting and ear stripping forces. Reference is made to my said copending application for a detailed description of the construction and operation of these backup rolls 23 and pressure plates 25.

As previously stated the butt ends of the ears 11 of sweet corn are connected to the stalks 10 by short stems 13 which project outwardly and upwardly in the direction of the tops of the stalks 10 to provide upwardly opening crotches 14 between the stems 13 and stalks 10 to support the ears at an acute included angle with reference to the stalks. While the cut and topped stalks 10 are being propelled in a generally upright position suspended from and firmly grasped between the operative stretches 21 of the pair of corn stalk conveyer belts 22, the stalks are brought between a pair of ear stripper bar means 30 fixed to each subframe 15, the minimum width of the space 31 between the pair of stripper bar means 30 (FIG. 3) being slightly greater than the thickness of the corn stalks 10 at the upper entering end thereof and this width progressively increasing to a maximum (FIG. 2) at the bottom leaving end thereof. Each of these gripper bar means comprises a flat plate 32 the flat sides of which are upright and which plate is horizontally elongated and mounted on the subframe 15 so that its generally horizontal longitudinal axis is at an acute included angle to the passing stalks 10 and in generally upright planes which converge downwardly toward each other relative to the line of travel of the passing stalks and positioned to provide the upper entering end to the space 31 (FIG. 3) arranged to receive the top ends of the succession of stalks 10 being conveyed so that the movement of these conveyed stalks along the plates 32 causes one of these plates to pass, in most instances, between the ear 11 and stalk 10 of each corn plant into the crotch 14 between the stem 13 and stalk 10. Each plate 32 is reinforced along its central longitudinal axis by a rib 33 and the plate has a top generally straight edge 34 and a downwardly convex curving bottom operative edge 35, this curvature being lengthwise of the plate and from its generally upright forward straight edge 36 to its generally vertical straight rear edge 38.

Welded to the forward end of each plate 32 and its reinforcing rib 33 along its forward end edge 36 in an L-shaped bearing bracket 39 having a flange 40 which forms a continuation of the plate 32 in offset parallel relation thereto and provides a space 41 for a sprocket 42. The L-shaped bracket 39 can be secured to the companion adjacent longitudinal side subframe bar 16 in any suitable manner, there being shown for this purpose a short length of channel 43 welded to the exterior of the L-shaped bracket 39 to project outwardly therefrom in perpendicular relation to the plate 32 and the outboard end of which is welded to the lower end of a channel bar 44 the upper end of which is welded to the outer face of the upright flange of the companion main longitudinal subframe side bar 16. Each sprocket 42 is an idler journalled for free rotation about a pin 45 which is suitably secured to the corresponding L-shaped bracket 39 and the teeth 46 of the sprocket are in line with the plate 32 (FIG. 4) with these teeth also forming a continuation of the upper and lower edge 34 and 35 of this plate so that an endless roller chain 48 riding along the top edge 34 of the plate 32 travels directly from the forward end of this top edge onto the teeth 46 of the idler sprocket 42 and so that these teeth deliver this chain to the forward end of the curving bottom edge 35 of this plate 32. For this purpose the roller chain 48 has alternate links 49 and 50 at each side which are pivotally joined together by pivot pins 51 each carrying a roller 52 which is smaller in diameter than the corresponding width of its link so as to provide a space forming a downwardly opening channel 53 embracing the top edge 34 of the plate 32, this channel opening upwardly and embracing the curving bottom edge 35 of the plate 32.

Each rear end of the endless chain 48 passes around the teeth 55 of a driving sprocket 56 fixed to a stub shaft 58 journalled in a bearing 59. This bearing is fixed to the plate 32 by means of an L-shaped bracket 60 and is fixed to the corresponding main longitudinal subframe bar 16 of the subframe 15 by means of an upright rod 61 having its lower end welded thereto and projecting upwardly along the outer face of the upright flange of the companion main longitudinal side subframe bar 16. The upper end of each tube 61 can be clamped to its main longitudinal side subframe bar by means of a clamping plate 62 and a pair of clamping bolts 63 extending through opposite ends of the clamping plate 62 and anchored in the main longitudinal side subframe bar 16.

Each transversely spaced pair of links 50 is bridged by a short length 64 of cylindrical tubing which can be welded thereto to form an outward projection or protrusion from the pair of links and arranged parallel thereto so that when traveling along the upper and lower edges 34 and 35, these short lengths of tubing 64 are in generally axially alined and butting relation to one another and form a moving bar-like tubular surface for actual engagement, in most instances, with the stems 13 supporting the ears 11 of corn on the stalks 10 and occasionally with the ear itself when positioned directly in the line of travel of the stalk.

The feature of the invention is to drive each chain 48 so that the bottom bar-like tube formed by these tubular segments 64 traveling along the curved bottom edge 35 of its plate 32 forms a moving surface traveling along with the passing stalks 10 at substantially the same speed so as to avoid the friction that would result from using an immobile bar. To so drive each chain 48, a sprocket 70 is fixed to its stub shaft 58 and is driven by a chain 71 from a pinion 72, the pinions 72 being mounted at the opposite ends of a shaft 73 journalled in bearings 74 at the opposite ends of the cross bar 19 of the subframe 15. This cross shaft 73 is in turn driven by means of sprocket 75 and chain 76 from any suitable source of power (not shown).

The stripped ears 11 fall onto a conveyer 78 in a chute or channel 79 to be conveyed to a gathering point, the stripped stalks being thrown back into the cornfield.

Operation

The corn plants are planted in rows in the cornfields and the stalks bear the ears 11 connected to the stalks by short stems 13 which project outwardly and upwardly to provide upwardly opening crotches 14 between the stems 13 and stalks 10 to support the ears 11 at an upwardly opening acute included angle with reference to the stalks.

As illustrated in detail in my said copending application, the harvester is propelled along the field and is steered so that the standing corn stalks pass between the two main longitudinal side frame bars 16 of the subframe 15. At the forward end of the subframe the standing corn stalks are cut off and topped and are guided between the contacting stretches 21 of the pair of endless V-belts 22, this portion of the harvester not being illustrated in the present application, but being described in detail in my said copending application.

The corn stalk sections 10 so brought between the contacting stretches 21 of the V-belt 22 are caused to be firmly grasped by these contacting operative stretches to the extent that the corn stalk sections 10 progress as an upright procession along with these operative stretches 21. For this purpose each operative stretch 21 is provided with a series of backup rolls 23 which serve to press the two operative or contacting stretches 21 together with sufficient pressure to hold the ear 11 upright and in fixed relation to these operative stretches. The progression of upright stalk sections 10, with their upper ends securely held between the opposing stretches 21 of the pair of corn stalk conveyer belts 22, then move upwardly with the these belts and are brought into the upper end of the space 31 between the pair of ear stripper mechanisms 30 carried by the subframe 15 at each side thereof.

As each upright corn stalk section 10 comes into the zone of action of the two ear stripping mechanisms, the upstanding tips of its ears project usually outwardly beyond the bottom operative stretches of the chains 48 and the tube sections 64 carried thereby. Since these bottom operative stretches of these chains 48 are supported at an acute included angle with reference to the passing stalks and in planes which diverge downwardly to provide a downwardly and rearwardly enlarging space 31, as the stalks continue their upward movement, the tube sections 64 on the bottom stretches of the two chains 48 move downwardly relative to the corn stalk sections 10 and by reason of their relatively close spacing enter the spaces between the ears 11 and the stalks 10. In those minority of occasions where the ear is directly in the line of travel of the stalks, the ears are broken off without injury by direct contact with these bar-like bottom series of tubular sections 64.

This bottom operative stretch of the chain 48 and its tubular sections 64 are driven to travel along with and at substantially the same speed as the progression of corn stalk sections 10 carried along by the operative stretch 21 of the endless V-belts 22, and hence any such initial contact with the ear involves only a downward relative movement of the bottom stretch of the chains 48 and their tube sections 64 and do not have a retarding effect which has been found to result in substantial damage and breakage of ears.

As the stalks continue their upward movement one or the other of the bottom operative stretches of the chains 48, together with their tubular sections 64, are brought into downward pressure contact with the top of the stem 13 of the ear and forces it downwardly breaking it from the stalk 10. Again this pressure contact is purely a downward pressure contact by virtue of the fact that the operative stretch of the chain 48 is moving along with the stalk sections 10 at the same rate of speed and hence the breakoff of the stem 13 is accomplished without turning or twisting of the ear 11 such as might result in its being bruised or broken.

The harvested ears so broken off fall downwardly onto the operative stretch of the conveyer 78 arranged in the ear receiving trough 79 while the stripped stalk sections 10 continue to be conveyed upwardly between and by the operative stretches 21 of the V-belt 22 to be ultimately thrown back into the field as described in detail in my said copending application.

Without the moving surfaces provided by the bar-like bottom series of tubular sections 64, as with my said copending application, it was found that occasionally a stalk section 10 would be broken by engagement with the non-moving surfaces and torn free of the operative stretches 21 of the conveyer belts 22. When this occurred, the stopped broken stalk would block the passage of subsequent stalk sections 10 so that the procession of stalk sections 10 would pile up until the harvester was stopped and cleared. With the moving surfaces provided by the bar-like bottom series of tubular sections 64, not only is the likelihood of such stalk breakage greatly reduced, but if its occurs the broken stalk will be carried by the moving surfaces and discharged from the rear end thereof so that it cannot block the succeeding procession of stalk sections 10 being processed.

What is claimed is:

1. Apparatus for separating the ears of sweet corn from the stalks of their plants in which the butt ends of the ears are connected to the stalks by short stems which project outwardly and in the direction of the upper parts of the stalks to provide upwardly opening crotches between the stems and stalks and to support the ears at an acute included angle with reference to the stalks and the apparatus having at least one ear stripping bar means adapted to pass between the ears and stalks of said plants and means moving said ear stripping bar means relative to said stalks to travel in closely spaced, transversely positioned relation to said stalks from said upper parts of said stalks to pass in most instances between the ear and stalk of each plant into the crotch between the stem and stalk to engage the side of the stem close to the stalk and break each ear from the stalk, wherein the improvement comprises said stripping bar means having a moving surface engaging with said side of the stem close to the stalk, and means moving said moving surfaces in the direction of the line of travel of said line of stalks at substantially the same speed so that said moving surface is substantially immobile, in said direction of the line of travel, with reference to the passing stalks and their ears.

2. Apparatus as set forth in claim 1 wherein said stripping bar means includes a plate arranged in a plane arranged in offset, generally parallel relation to said stalks and having one operative edge positioned to enter crotches between the ears and the adjacent sides of said stalks, and said moving surface comprises a chain traveling along in engagement with said operative edge.

3. Apparatus as set forth in claim 2 wherein said chain is a link and roller chain with one side forming a channel embracing and with its rollers engaging said operative edge.

4. Apparatus as set forth in claim 3 wherein certain of the links of said chains have elongated protrusions projecting from the side of said chain opposite its said channel and being in generally axial alinement when traveling along said operative edge to render said moving surface generally bar-like in form.

5. Apparatus as set forth in claim 1 wherein said stalks are held generally upright while moving relative to said stripping bar means and said stripping bar means includes an upright plate arranged at each side of the moving stalks with their lower edges positioned to enter said crotches between the ears and stalks and said moving surface comprises a chain traveling along in engagement with each of said lower edges.

6. Apparatus as set forth in claim 5 wherein said plates are positioned to diverge downwardly with reference to each other.

7. Apparatus as set forth in claim 6 wherein said plates are positioned to diverge with reference to each other in the direction of travel of the generally upright stalks with reference thereto.

8. Apparatus as set forth in claim 5 wherein each of said chains is a link and roller chain with one side forming a channel embracing and with its rollers engaging said lower edge of its plate.

9. Apparatus as set forth in claim 8 wherein certain of the links of each chain have elongated protrusions projecting from the side of the chain opposite its channel and being in generally axial alinement when traveling along said lower edge to render said moving surface generally bar-like in form.

10. Apparatus as set forth in claim 5 wherein said lower edge is of downwardly convex curved form.

References Cited
UNITED STATES PATENTS

| | | | |
|---|---|---|---|
| 995,836 | 6/1911 | Wyckoff | 56—17 |
| 2,281,904 | 5/1942 | Wurtele | 56—17 |
| 2,782,581 | 2/1957 | Thomson | 56—17 |

ANTONIO F. GUIDA, Primary Examiner

PO-1050
(5/69)

UNITED STATES PATENT OFFICE
CERTIFICATE OF CORRECTION

Patent No. 3,473,303            Dated October 21, 1969

Inventor(s) Howard Dale Ellis

It is certified that error appears in the above-identified patent and that said Letters Patent are hereby corrected as shown below:

Column 1, line 22, change "sweet corn mobile harvester" to --Sweet Corn Mobile Harvester--; line 23, change "Application" to --application--; line 23, after "abandoned" insert --,--; and lines 30-31, delete "portions, upright, along a bar means positioned to" and substitute --and force the stem toward the bottom part of the--.

SIGNED AND
SEALED
FEB 17 1970

(SEAL)
Attest:

Edward M. Fletcher, Jr.
Attesting Officer

WILLIAM E. SCHUYLER, JR.
Commissioner of Patents